Oct. 20, 1970         C. A. SUTER         3,534,884

PRESSURIZABLE CONTAINER AND METHOD OF PREPARATION

Filed July 1, 1968

INVENTOR.
CHARLES A. SUTER
BY
ATTORNEY

United States Patent Office 3,534,884
Patented Oct. 20, 1970

3,534,884
PRESSURIZABLE CONTAINER AND METHOD
OF PREPARATION
Charles A. Suter, Cuyahoga Falls, Ohio, assignor to The
Goodyear Tire & Rubber Company, Akron, Ohio, a
corporation of Ohio
Filed July 1, 1968, Ser. No. 741,474
Int. Cl. B65d 25/00
U.S. Cl. 220—85     4 Claims

ABSTRACT OF THE DISCLOSURE

This invention relates to a pressurizable or nonvented flexible container and the method of making said container wherein the autogenous pressure developed within the flexible container by the fluids therein is relieved by compressing a flexible means.

This invention relates to a nonvented liquid fuel container and the method of making said container.

More particularly, this invention relates to a pressurizable flexible fabric or flexible elastomeric container and to the method of making said containers.

Gasoline tanks that are used on automobiles have traditionally been open to the atmosphere, i.e., vented, and are of the so-called breathable type because it was not economical to provide a tank that was capable of withstanding the pressures developed by the gasoline due to changes in temperature. Also, to provide metal tanks of sufficient strength to withstand these pressures would materially affect the weight and load distribution along the automobile carriage.

Recent requirements that automobiles limit the emission of hydrocarbon vapors so as to decrease air pollution have made nonvented tanks more desirable.

Therefore the object of this invention is to provide a flexible container that is relatively light in weight, low in cost, and that is not vented to the atmosphere which can be used as a fuel container for an automobile or related vehicle.

Figure 1:
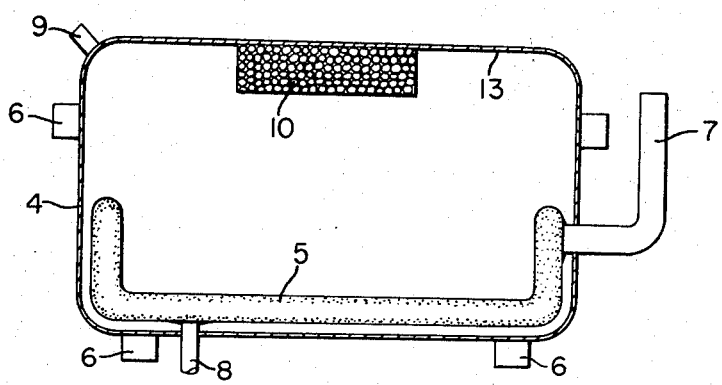
Figure 2:
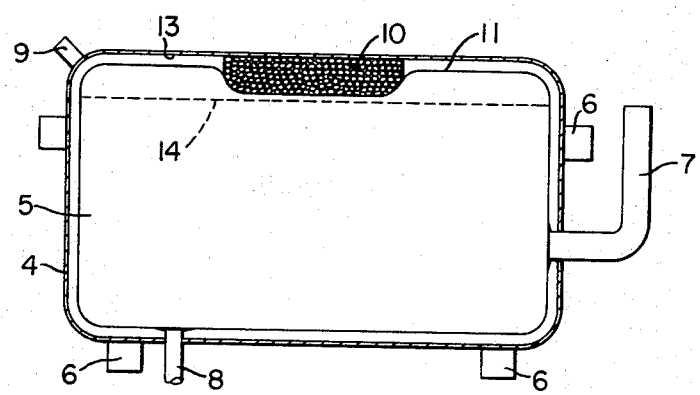
Figure 3:
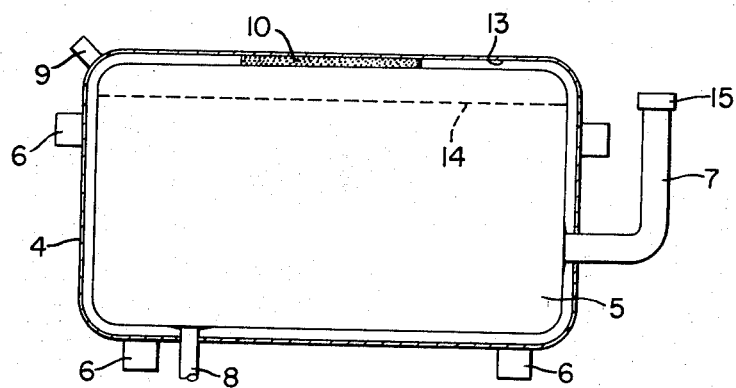

Further objects and advantages of this invention can be more readily understood by reference to the drawings wherein FIG. 1 is a cross-sectional view through an empty flexible pressurizable container positioned in the fuel container mount means;

FIG. 2 is a view of FIG. 1 wherein the tank is full of fuel and essentially ready to be pressurized when the inlet and outlet openings are closed; and FIG. 3 is a view through the fuel tank showing the tank under pressure.

Referring to FIG. 1, numeral 4 denotes generally a receptacle within which the pressurizable, flexible container or tank 5 is fitted. Referring more particularly to the receptacle 4, it will be noted that the receptacle for the tank is attached to the automobile body by suitable means such as brackets or flanges 6 positioned about the receptacle. Also, it should be appreciated the receptacle can be the automobile body or frame itself. With the tank 5 positioned within the receptacle 4 the filling inlet 7 will project through an opening in the receptacle and upward for ready access to permit the tank to be filled with fuel. Also, tank 5 has an outlet 8 in the bottom thereof with appropriate valve and pump means to permit the fuel to be pumped therefrom and supplied to an engine (not shown). Since the tank 5 is flexible and thus will collapse and expand depending on the pressures therein, it is essential that the receptacle 4 contain at least one vent 9 to permit the air within the receptacle to be displaced therefrom as the fuel tank 5 is filled or expands under pressure. Positioned in the top of the receptacle 4 is a flexible member 10 which prevents the tank 5 from being over-filled and thus regulates the amount of hydrostatic pressure that develops therein.

Referring specifically to FIG. 2, it will be seen that tank 5 has moved out to fill essentially the contour of the receptacle 4 as the tank is filled with fuel. The flexible member 10 restrains the top surface 11 of the tank from moving upward until it contacts the surface 13 in the top position of the receptacle. When the fuel level reaches the height 14, the flexible member 10 will cause the fuel to move up the inlet line to overflow the tank as the pressure level due to the height of the fuel in the inlet line will be insufficient to compress member 10.

Referring to FIG. 3 it will be seen that the fuel tank 5 is filled to line 14 and closed by cap 15. Thus, any temperature change, for instance, as the fuel warms up during the day, will cause the pressure in the tank to increase due to the increase in the vapor pressure of the fuel together with the air that is in the tank. This change in temperature will effect the pressure within the tank and thus cause the tank to expand or contract. This pressure then is utilized to compress the flexible means 10 to move it up into the position shown in FIG. 3 where the flexible member 10 is essentially in the same plane as the top of the receptacle 4. Thus, by this mechanism the container is able to expand and dissipate at least some of the pressure as it accumulates due to autogenous conditions within the fuel container.

In a preferred embodiment the flexible member 10 is a piece of flexible foam such as polyurethane or a polyvinyl chloride foam or it can be foam prepared from the latex of a hydrocarbon polymer such as natural rubber or the homo or hetero type rubbery polymers of butadiene, isoprene and styrene or other related α-olefins containing from 2 to about 20 carbon atoms and preferably a conjugated diene of 4 to 8 carbon atoms. Specific examples of these rubbers are the nitrile butadiene-styrene, polybutadiene or polyisoprene.

The flexible member 10 is shown in the drawings as located in the top position of the receptacle 4 but it should be appreciated that it is not essential that the flexible member be positioned in the top of the receptacle as it might be positioned on the side thereof, but it is preferred that it be positioned on the top of the receptacle as this would avoid the flexible member having to support the weight of the fuel in the tank.

Also, instead of using a foam, certain mechanical devices such as spring-actuated members or a hydraulic displaceable fluid member may be utilized. Where such mechanical devices are used, it will be necessary to provide wear members such as heavier rubber padding or fabric reinforcing between the tank and the mechanical device to protect the tank from excessive wear.

The fuel containers of this invention are preferably prepared in the usual manner by coating a fabric with elastomeric material either by a calendering or a spreading operation or preferably by application of elastomeric material in a suitable solvent to obtain a fabric that is rubberized. This fabric, either before or after its rubberization is shaped into the form of an enclosed container by cementing or sewing the seams with a suitable cement. The container may be shaped or built on a form such as a cardboard box or in some cases the fabric preferably as an open-ended tube is spread upon a flat surface and coated with a spray coat of a suitable polyurethane, either as a solution thereof or as a reaction mixture. Then the fabric is turned and spread again to permit the other side to be coated where it is so desired. Then the fabric is cemented together to give a liquid-tight container which has the desired fittings for the inlet and outlet means. In general, it is preferred to apply on the inside of the fabric container or between the elastomer coatings on the fabric a fuel barrier such as a coating of nylon, polyvinylidene chloride or the other materials well known to the art.

The following illustrative example is set forth to further exemplify the objects and advantages of this invention. The parts and percentages are by weight unless otherwise indicated.

EXAMPLE I

A tank suitable for use in an automobile and to be positioned in the normal position under the rear end of the automobile, except it is supported by a metal plate suspended from the automobile body by suitable brackets, was prepared from two calendered flexible rubber sheets of about 60 mils thickness. These sheets were prepared from a composition that was compounded in the manner shown in the recipe below:

| Compound: | Parts |
|---|---|
| Butadiene-acrylonitrile copolymer | 100 |
| Zinc oxide | 5 |
| Sulfur | 1.5 |
| Magnesium carbonate | 2.25 |
| Carbon black (fine thermal furnace and HAF | 112 |
| Dioctyl phthalate | 17 |
| Aryl-p-phenylene diamines | 0.5 |
| Polyvinyl chloride resin | 43 |
| Adipic acid ester plasticizer [1] | 35 |
| Accelerator-mixture of a benzothiazole sulfonamide and a benzothiazole disulfide | 1.75 |
| Total | 318.0 |

[1] Obtained as Adipal BCA from The F. M. C. Corporation.

To the first and second sheets was adhered a transparent thermoplastic film of nylon of the Nylon-6 type made from a polymer of ε-caprolactum having a thickness of about 1 mil (obtained as Capran from The Allied Chemical Company) with a curable butadiene-acrylonitrile rubber adhesive labeled as rubber adhesive (A) to form a laminate. The curable rubber adhesive (A) had the following composition:

| | |
|---|---|
| Butadiene-acrylonitrile copolymer | 72 |
| Zinc oxide | 3.5 |
| Sulfur | 1 |
| Carbon black (SRF) | 21 |
| Accelerator (a benzothiazole disulfide) | 0.5 |
| Phenolic resin | 83.5 |
| Methyl ethyl ketone | 548 |
| Total | 730.5 |

The two rubber sheets having the nylon film laminated thereto was placed within the halves of a mold for a fuel tank while at a sufficient temperature to be deformable and then a vacuum was placed on the mold to cause the sheets to take on the contour of the tank mold. The two halves of the mold were closed and the two sheets were cemented together to give a fuel-tight tank by the curable adhesive (A) which was applied prior to closing the mold. It should be noted that appropriate inlet and outlet fittings were attached to the sheet in the customary manner after the mold was closed. Then this rubber tank, after being cured at about 120° C. for two hours was removed from the mold and attached to the automobile in the normal manner by the use of suitable attaching brackets. A piece 12 x 6 x 3 inches was cut from a slab of polyetherurethane foam having a density of 1.5 pounds per cubic foot and an ASTM No. D–1564–64T (Method A) load deflection, pounds, minimum at 25 percent deflection of 16 and at 65 percent deflection of 30. This piece of foam was placed between the fuel tank and the body of the automobile. When this tank was filled with fuel to the normal fill line and subjected to operating conditions it was able to withstand the pressures developed due to the change in temperature as the fuel was used without venting to the air.

While certain representative embodiments and details have been shown for the purpose of illustrating the invention, it will be apparent to those skilled in this art that various changes and modifications may be made therein without departing from the spirit or scope of the invention.

What is claimed is:

1. A pressurizable flexible container including an inlet and an outlet means having fluid communications with a chamber enclosed within said container, said chamber having at least one movable part to change the volume of the chamber in response to the pressure therein, said movable part of said chamber moving in response to the autogenous pressure generated by the fluid therein to compress a flexible compressible means to thereby enlarge the volume of the chamber and reduce the pressure on said container.

2. The container of claim 1 wherein the chamber is formed of elastomeric coated fabric.

3. A pressurizable flexible container including an inlet and an outlet means having fluid communications with a chamber enclosed within said container, said chamber having at least one movable part to change the volume of the chamber in response to the pressure therein, said movable part of said chamber moving in response to the autogenous pressure generated by the fluid therein to compress a flexible compressible foam to thereby enlarge the volume of the chamber and reduce the pressure on said container.

4. The container of claim 3 wherein the flexible compressible foam is positioned above the inlet means to regulate the overfill of the container by the hydrostatic pressure developed within said container.

References Cited

UNITED STATES PATENTS

| 2,273,505 | 2/1942 | Florian. | |
|---|---|---|---|
| 2,331,097 | 10/1943 | Watter. | |
| 2,558,807 | 7/1951 | Bailey | 220—63 X |
| 2,968,318 | 1/1961 | Bauman. | |
| 3,075,576 | 1/1963 | Herbert | 222—386.5 |
| 3,409,714 | 11/1968 | Strugar. | |
| 3,417,901 | 12/1968 | Sands | 222—386.5 X |

JOSEPH R. LECLAIR, Primary Examiner

J. R. GARRETT, Assistant Examiner

U.S. Cl. X.R.

138—30